(No Model.)
P. MILLER.
DEVICE FOR FELLING TREES.
No. 306,850. Patented Oct. 21, 1884.
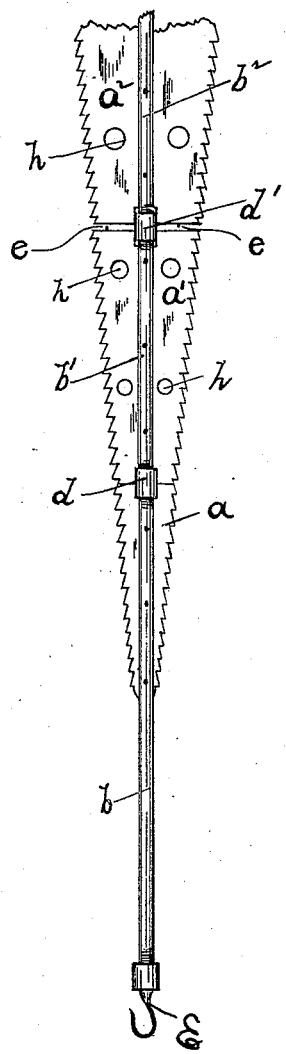
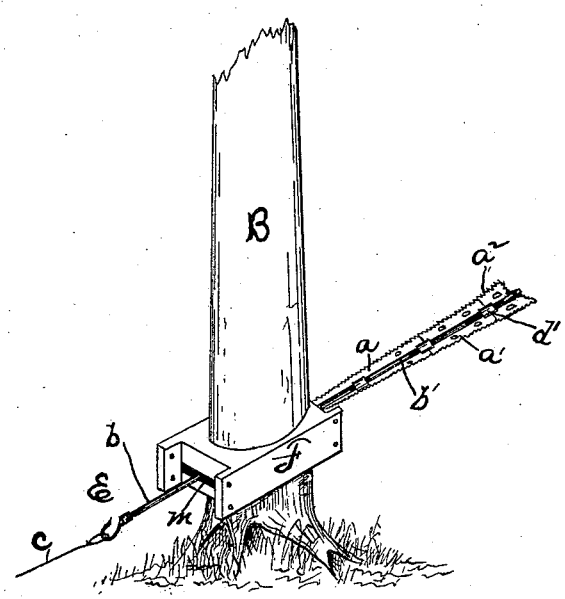
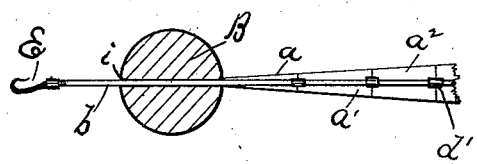
Witnesses:
S. Ashbel Crandall
Tyler J. Howard.
Inventor:
Philip Miller,
By his Attorney
Frank H. Allen

UNITED STATES PATENT OFFICE.

PHILIP MILLER, OF NORWICH, CONNECTICUT.

DEVICE FOR FELLING TREES.

SPECIFICATION forming part of Letters Patent No. 306,850, dated October 21, 1884.

Application filed September 6, 1884. (No model.)

*To all whom it may concern:*

Be it known that I, PHILIP MILLER, of the city of Norwich, county of New London, and State of Connecticut, have invented a certain new and useful Improvement in Devices for Felling Trees, which improvement is fully set forth and described in the following specification, reference being had to the accompanying drawings.
My invention relates to a certain improvement in saws for felling forest trees, and is intended to be used in connection with certain devices described in a former application for a patent filed by me August 8, 1884, Serial No. 140,058, to which application and specification reference is hereinafter made.

The immediate object of this present improvement is to produce with the same movement of the saw-blade a cut twice the depth of that produced in my former invention, using the same motive power, and also to make my saw in detachable sections of convenient length and weight.

In the accompanying drawings, Figure 1 represents the trunk of a standing tree having my new form of saw properly attached and ready for use. Fig. 2 is a cross-section of said tree-trunk through and on a line with the hole through which the saw is to be drawn, as hereinafter described. Fig. 3 is an enlarged view of three sections of said saw.

My saw may be briefly described as being made up of tapered sections, having cutting teeth on each of said tapered edges. The sections $a$, $a'$, and $a^2$ are secured to a "backbone," $b$, $b'$, and $b^2$, which is formed, preferably, by placing ribs of half-round iron or steel on each side of the saw-sections and riveting through and through. The contiguous ends of said backbone are provided with right and left hand screw-threads to receive the coupling-nuts $d$ and $d'$. The several sections are held in the same plane by dowel-pins $e$, or by any similar device which, while it holds said sections in line, will not extend above the surface of the saw. On the outer end of rod $b$ is screwed a hook, E.

The several sections of the saw are preferably provided with holes $h$, forming pockets to receive the sawdust while in the act of cutting through the tree, thus preventing unnecessary friction.

My device is used as follows: The tree which is about to be sawed off or partly sawed off is bored through, as at $i$, Fig. 2, the opening thus made being large enough to easily admit the rod $b$. The several sections of the saw being now properly assembled and secured to each other, one end of rope $c$ is attached to hook E, the other end being fastened to a falling tree, as fully described in my former application of August 8, 1884, above referred to, it being my purpose to utilize the power and momentum of a falling tree, as therein described. As the falling tree draws rope $c$ forward with great power, my double-edge saw is drawn into and through hole $i$, cutting a kerf on each side as it advances. The taper of the saw should be such that when the full stroke of the falling tree is attained the tree B will be sawed off except at two opposite sides, where sufficient stock is left intact to support the tree until the saw is adjusted on another tree, and it becomes necessary to drop tree B, when a few strokes of an ax will cut through to the saw-kerf and the tree will fall. Should it become necessary to support the saw-blade in a horizontal position, a guide-block, substantially as at F, Fig. 1, having a slot, $m$, for the saw to pass through, may be secured to the tree; but in ordinary cases the saw, when once started, will follow its kerf and remain nearly level.

It will be evident that any form of cross-cut teeth can be applied to the saw—either insertible teeth or those formed as an integral part of said saw.

Having thus described my invention, I claim—

1. A saw formed of one or more tapered plates having cutting-teeth on both edges and stiffened by a rod or rods secured fixedly to the longitudinal center of said plate or plates, substantially as and for the purpose specified.

2. The within-described saw, formed of a series of tapered sections detachably connected to each other, each of said sections being provided with cutting-teeth on both sides, all substantially as and for the purpose specified.

3. The combination, in a saw, of a series of tapered plates having cutting-teeth on both edges, a sectional backbone or stiffening-rib with threaded ends, and coupling-nuts, by means of which the contiguous ends of said rib and saw-plates may be secured together, suitable means being provided to keep the several plates of the series in the same plane, substantially as and for the purpose specified.

PHILIP MILLER.

Witnesses:
   FRANK H. ALLEN,
   TYLER J. HOWARD.